Nov. 5, 1946.　　　　S. E. BOUCHARD　　　　2,410,704

OPHTHALMIC MOUNTING

Filed April 1, 1944

SAMUEL E. BOUCHARD
INVENTOR

BY

ATTORNEYS

Patented Nov. 5, 1946

2,410,704

UNITED STATES PATENT OFFICE 2,410,704

OPHTHALMIC MOUNTING

Samuel E. Bouchard, Brighton, N. Y., assignor to Bausch & Lomb Optical Company, Rochester, N. Y., a corporation of New York Application April 1, 1944, Serial No. 529,159

6 Claims. (Cl. 88—47)

This invention relates to ophthalmic mountings and more particularly to an ophthalmic mounting in which screws are used to secure the lenses in the mounting.

Ophthalmic mountings have long been used in which the lenses are held therein by means of screws. These mountings have been subjected to the criticism that eventually the screws work loose and fail to securely hold the lenses in the desired position in the mounting. This displacement of the lenses often impaired the visual acuity of the wearer for where an astigmatic or like condition exists, the lenses must be held in a predetermined position before the eyes of the wearer. The failure of the screws to securely hold the lenses in the mountings not only impaired the effectiveness of some lenses but also resulted in an annoying condition in that the screws had to be continually tightened.

It is the principal object of the present invention to provide an ophthalmic mounting which, while employing screws for holding the lenses in the mounting, will prevent the screws from working loose without resorting to means separable from the mounting. Separable elements have heretofore been used for locking the screws against accidental rotation but as they complicate the mounting, they have not been widely used.

In the preferred embodiment of the invention, means integral with the lens strap are used to form a locking means for preventing turning of the screws and thus the difficulty experienced when separable pieces are used is not present in the mounting of the present invention. The locking means of the mounting herein disclosed comprises an extension or arm which is bent back or folded over on the strap and in the preferred embodiment of the invention, the strap, as well as the folded over extension is tapped and the mounting screw, passed through the opening drilled in the lens, is threaded into the tapped aligned openings formed in the strap and the folded over extension. To complete the assembly of the lens in the mounting after the screw has been tightened to draw the surface of the lens against the strap, the folded over extension is turned relative to the strap to bind the threads of the screw engaged by the threads of the opening in the strap. The turning of the extension also forces a portion of the wall of the opening formed therein against the screw and tends to jam the threads of the portion of the screw so engaged. This dual locking action is sufficient to prevent accidental turning of the screw.

In a modified form of the invention, although an opening is formed in the folded over extension, this opening is not tapped but is merely made large enough to permit the screw to be inserted therein. In this embodiment of the invention the folded over extension is also turned relative to the strap after the screw has been tightened to frictionally hold the screw against accidental rotation.

As the locking means is merely a folded over extension of the strap little difficulty is experienced in securing a lens in the mounting as is experienced with prior mounting having various locking devices separate from the mounting for preventing turning of the screw. As the extension is folded over on the strap, it is not easily seen and, therefore, will not detract from the appearance of the mounting when worn.

Other objects and advantages of the present invention will appear from the following description taken in connection with the accompanying drawing in which.

Figure 1:
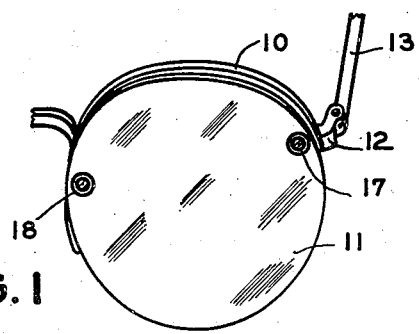
Fig. 1 is a perspective view of a fragmentary portion of a mounting embodying my invention.

In the illustrated embodiment of the form of the mounting shown in Fig. 1, 10 indicates a rim member which is located rearwardly of the lens 11 and is of such a shape that it follows the contour of the top edge of the lens. The rim member 10 carries an endpiece 12 to which is pivotally mounted a temple 13.

The rim member 10 carries a pair of straps which are adapted to engage the rear surface of the lens 11 when the latter is secured in the mounting. One strap is secured to the rim member 10 at the temporal side of the member and is shown at 14 in Fig. 2. It will be understood that a similar strap is attached to the rim member 10 contiguous to the bridge and engages the rear face of the lens 11 adjacent its nasal edge. As the straps are of an identical structure, only one strap has been illustrated in Fig. 2 and although this strap will be hereinafter described, it should be understood that the strap used to secure the nasal edge of the lens is identical with strap 14.

The lens 11 is provided with a substantially circular aperture 15 adjacent its temporal edge and positioned within the aperture 15 is a coiled spring 16 having a length substantially equal to the thickness of the lens 11. The lens 11 is secured to the strap member 14 by means of a screw 17 which is passed through the spring 16 and threaded into an opening formed in the strap member 14. A washer 18 formed of metal, zylonite, or other suitable material, is positioned between the head of the screw 17 and the front face of the lens 11. The diameter of the screw 17 is slightly greater than the smallest internal diameter of the spring 16 which is preferably formed somewhat elliptical in shape and hence the screw is resiliently engaged by the spring 16 and a resilient connection between the screw and the lens is thus formed.

Figure 6:
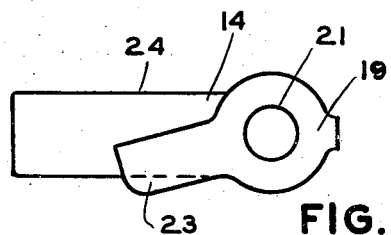
Fig. 6 is an enlarged view of the strap shown in Fig. 4 after the extension has been folded over onto the strap.
Figure 4:
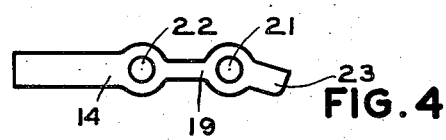
Fig. 4 is a plan view of the lens strap of the present invention.
Figure 5:
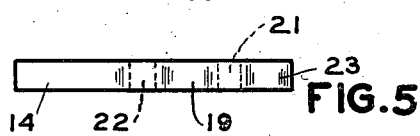
Fig. 5 is an edge view of the blank from which the strap shown in Fig. 4 is formed.

The strap 14, referring now to Fig. 4, is formed with an integral arm 19 which in the form of the invention now preferred, is formed with an opening 21 which is similar to the opening 22 formed in the strap 14. The arm 19, during the operations forming the strap 14, is bent over or folded back on the strap 14 as clearly shown in Fig. 6 to bring the aperture 21 into alignment with the aperture 22 after which the openings are tapped. The arm 19 is formed with a finger 23 which when the arm is folded over on the strap 14 extends obliquely to the longitudinal axis of the strap.

Figure 7:
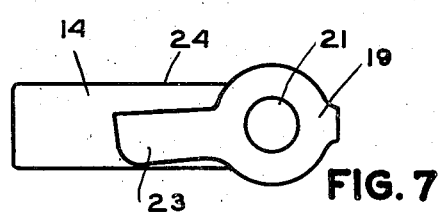
Fig. 7 is a view similar to Fig. 6 but showing the position of the folded over extension after it has been turned relative to the strap.

In assembling a lens in the mounting of the present invention the washer 18 is slipped over the screw 17 and after the spring 16 has been inserted in the opening 15, the screw 17 is threaded into the aligned openings 21 and 22 to clamp the one face of the strap 14 against the rear surface of the lens 11. The technician then through a suitable tool, such as a pair of pliers, turns the folded over arm 19 relative to the strap 14. This may be easily accomplished by placing one jaw of the plier against the one edge face of the finger 23 and the other jaw against the edge face 24 of the strap 14 and applying sufficient pressure to move the finger 23 into the position shown in Fig. 7. As the metal from which the strap and arm are formed is ductile, the same will allow the arm to be twisted as described and bind the threads of the screw 17 and thus prevent accidental turning of the screw. The locking action is due to the fact that the folded over arm actually serves as a lock nut when turned relative to the strap. Furthermore this movement of the arm causes the softer metal of the same to be swaged by the threads of the screw and thus jam the threads to more tightly hold the screw against accidental turning.

Figure 2:
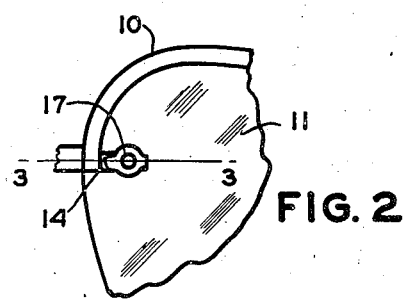
Fig. 2 is a rear fragmentary view of a portion of the mounting shown in Fig. 1.
Figure 3:
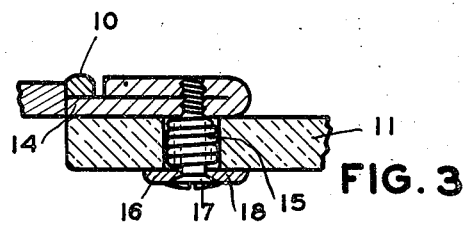
Fig. 3 is a section taken along line 3—3 of Fig. 2.
Figure 8:
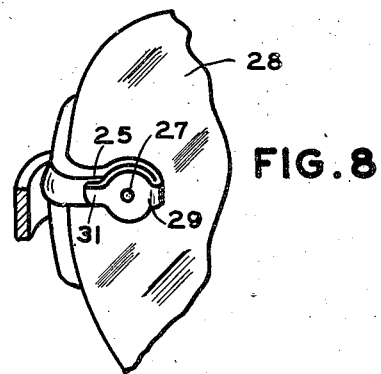
Fig. 8 is a fragmentary view in perspective of a modified form of the invention.
Figure 9:
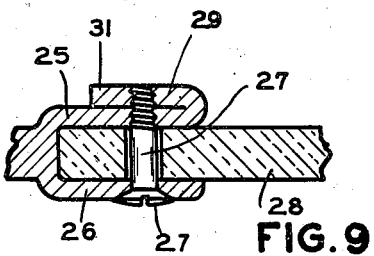
Fig. 9 is a sectional view similar to Fig. 3 but showing the modified form of the invention shown in Fig. 8.

Although the invention has been shown in Figs. 1 through 3 as applied to the so-called semi-rimless mounting, the invention may be used in connection with rimless mountings and I have shown in Figs. 8 and 9 my invention applied to such a mounting. In this embodiment of the invention the mounting comprises in addition to the rear strap 25 which is similar to the strap 14 a front strap 26 formed with a suitable aperture for receiving the screw 27 which is used to secure the lens 28 between the straps 25 and 26. It will be understood that in this form of the invention after the screw 27 has been threaded into the aligned openings of the strap 25 and the folded over arm 29 that the latter will be turned through the finger 31 to bind the threads of the screw 27 as in the earlier described embodiment of this invention.

Figure 10:
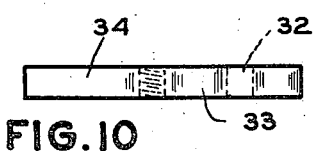
Fig. 10 is a view similar to Fig. 5 but showing a modified form of the strap.

I have shown in Fig. 10 a modified form of the strap in which the opening 32 formed in the arm 33 formed integral with strap 34 is not tapped or threaded. In this embodiment of the invention the opening 32 is merely made large enough to receive the mounting screw used to secure the lens to the strap. The arm 33 is turned in this form of the invention as were the arms 19 and 29 of the forms of the invention previously described, but does not, of course, act as a lock nut as here the arm is used merely to be moved into contact with the threads so as to bind the threaded portion of the screw received in the opening 32.

In all forms of the invention shown the strap formed with the integral arm is used as the rear strap in the mounting so that the arm is not visible when the mounting is worn by a patient. Thus the mounting of the present invention when viewed from the front has the appearance of a conventional screw mounting.

Although the preferred embodiments of the present invention have been illustrated and described herein, it is to be understood that the invention need not be limited thereby but is susceptible of changes in form and detail within the scope of the appended claims.

I claim:

1. An ophthalmic mounting comprising a lens engaging strap having a threaded opening formed therein; a screw adapted to be passed through an opening in a lens and threaded into the opening formed in said strap for securing said lens to said strap; and an extension formed integral with said strap and folded over on the same, said extension having an opening formed in alignment with the threaded opening of said strap, the material of said strap being ductile so that said extension can be turned about the fold to bind the threads of the screw.

2. An ophthalmic mounting comprising a lens engaging strap formed of ductile metal and having a threaded opening formed therein; a screw adapted to be passed through an opening in a lens and threaded into the opening formed in said strap for securing said lens to said strap; a lock nut into which said screw is threaded, said lock nut being integral with said strap, the ductile metal joining said nut to said strap permitting said nut to be turned after said screw has been threaded into said nut; and means for turning the nut to bind the screw and hold the same against accidental rotation.

3. An ophthalmic mounting comprising a lens engaging strap having a threaded opening formed therein; a screw adapted to be passed through an opening in a lens and threaded into the opening formed in said strap for securing said lens to said strap; locking means for binding the threads of the screw, said locking means comprising means substantially coextensive with said strap and in facewise engagement therewith, said locking means being integrally joined at one end to said strap by ductile material and being formed with a threaded opening aligned with the opening of said strap; and means projecting from said locking means for turning the same relative to said strap after said screw has been threaded into said aligned openings for binding the threads of said screw to hold the latter against accidental rotation.

4. An ophthalmic mounting comprising a strap having a lens engaging surface, said strap having a threaded opening formed therein; a screw adapted to be passed through an opening in a lens and threaded into the opening formed in said strap for clamping said lens against the lens engaging surface of said strap; and a lock nut engaging the face of said strap opposite the said lens engaging face, said nut being integrally joined with said strap by a reversely folded neck portion, the material of the portion being sufficiently ductile to permit said nut to be turned relative to said screw and strap, said nut having a projecting finger whereby it may be turned relative to the screw after said screw has been tightened in said strap to bind the threads and hold the screw against accidental turning.

5. An ophthalmic mounting comprising a strap having a lens engaging surface, said strap having a threaded opening formed therein; a screw adapted to be passed through an opening in a lens and threaded into the opening formed in said strap for clamping said lens against the lens engaging surface of said strap; and an arm engaging the face of said strap opposite the said lens engaging face, said arm having an opening therein in alignment with the threaded opening of said strap, said arm being integrally joined with said strap by a reversely folded neck portion, the material of said strap, portion and arm being sufficiently ductile to permit said arm to be turned into engagement with the portion of the screw passed through said strap for frictionally holding said screw against accidental rotation.

6. In an ophthalmic mounting having a lens engaging strap secured to a lens by a screw passing through an opening in the lens and threaded through an opening in the strap, the combination of a member having an opening, a ductile neck portion integrally connecting the member to the strap, said portion being reversely formed to position the member in facewise engagement with the strap and with the openings in alignment, the member being turned relative to the strap to bring the wall of the opening in the member into binding engagement with the threads of the screw extending through the opening in the strap.

SAMUEL E. BOUCHARD.